MOTION COMPENSATING APPARATUS

Original Filed Sept. 4, 1970 3 Sheets-Sheet 1

MOTION COMPENSATING APPARATUS

Original Filed Sept. 4, 1970 3 Sheets-Sheet 2

MOTION COMPENSATING APPARATUS

Original Filed Sept. 4, 1970 3 Sheets-Sheet 3

United States Patent Office

Re. 28,218
Reissued Oct. 29, 1974

28,218

MOTION COMPENSATING APPARATUS

James W. E. Hanes, Ventura, and Edward Larralde, Santa Barbara, Calif., assignors to Vetco Offshore Industries, Inc., Ventura, Calif.

Original No. 3,714,995, dated Feb. 6, 1973, Ser. No. 69,759, Sept. 4, 1970. Application for reissue Dec. 18, 1973, Ser. No. 422,871

Int. Cl. E21b *7/12*

U.S. Cl. 175—5 42 Claims

Matter enclosed in heavy brackets [ ] appears in the original patent but forms no part of this reissue specification; matter printed in italics indicates the additions made by reissue.

ABSTRACT OF THE DISCLOSURE

Compensating apparatus connected between a travelling block of a well bore rig mounted on a vessel float in a body of water and a hook from which a running string is supportable, the compensating apparatus including a pair of elongate cylinders straddling and connected to the travelling block and a pair of companion piston rods connected to and straddling the hook and secured to pistons relatively longitudinally shiftable in the cylinders, liquid under pressure being maintained in the cylinders under the pistons to support a substantial portion of the weight of the running string suspended from the hook. The compensating apparatus can be rendered inoperative when desired. Shock absorbers retard sudden upward movement and retraction of the compensating apparatus in the event of sudden release or diminution of the load on the apparatus, as might result from failure of the running string.

The present invention relates to apparatus for controlling the stress in a running string, and more particularly to apparatus used on or in connection with a floating vessel for maintaining the strain in a running string, such as a pipe string, substantially constant while being used in the performance of diverse functions in a sub-aqueous well bore, such as drilling and completion operations therein, despite vertical movement of the vessel while such operations are being performed.

In the normal operation of drilling a well bore on land, or from a drilling platform supported in a fixed position from the ocean floor, the weight on the drilling bit is equal to the total weight of the drilling string less the weight of the drill pipe carried by the drawworks. Usually, the weight impósed on the bit is equal to the weight of the drill collar sections connected to the lower end of the drill pipe. In drilling a sub-aqueous well bore from a floating vessel, the heaving of the vessel under tide, wind and wave conditions introduces problems of maintaining the drilling weight on the bit at the desired value. At the present time, compensation for vessel heaving is generally accomplished through use of a slidable spline connection in the drill string above the drill collars. Although such slidable spline connection is widely used, it presents many difficulties, the principal one being the requirement that it transmit torque. When subjected to high torque, sufficient friction is developed in the spline as to render the free sliding of the joint ineffective. Moreover, such slidable spline connections have comparatively low torsional strength, resulting in their failure with attendant very high fishing costs. At times, the result of the failure has been the abandonment of a costly well.

Motion compensating devices have been proposed for overcoming the aforenoted difficulty, in which the drill string is supported hydraulically by interposing a compensating apparatus between the travelling block and hook of the usual drilling apparatus employed in drilling the well bore. Such types of apparatus, and similar apparatus, are illustrated in U.S. Pat. Nos. 2,945,676, 2,945,677, 3,151,-686, 3,158,206 and 3,158,208. In general, the devices illustrated therein rely upon the maintenance of the predetermined fluid pressure in the cylinder and piston mechanism, while permitting relative telescopic movement to occur between the cylinder and piston portions of the mechanism.

Where the compensating apparatus is interposed between the travelling block and hook, the available height or head room in a derrick is reduced. Derricks used on drilling vessels are designed to provide for normal drilling operations, that is, to provide for the removal of and running in of maximum lengths of drill pipes with respect to the well bore. The length added between the travelling block and hook, such as in the arrangement illustrated in U.S. Pat. No. 2,945,676, materially lessens, the available maximum travel of the drawworks or hoisting apparatus, requiring the raising and lowering of shorter strands of drill pipe in the well bore, which thereby increases the time required in making a round trip of the pipe in the well bore.

By virtue of the present invention, a compensating apparatus is so related to the travelling block and hook as to provide for a desirable maximum stroke of the compensating apparatus, but in which the distance added by the compensating apparatus between the travelling block and hook is considerably reduced. As an example, only about one-half of the height required with prior art devices is added with applicant's combination of compensating apparatus supported between the travelling block and a hook therebelow.

An object of the present invention is to provide apparatus in which the height added between the travelling block and hook is reduced considerably by arranging the compensating apparatus in such manner that a substantial portion of its length straddles the travelling block and the hook, thereby retaining a much greater derrick working height than provided by the mechanisms of the prior art.

The motion compensating apparatus is rendered inoperative during "round tripping" of the drill pipe, or the like, the hook being mechanically locked to the travelling block permitting their joint movement in the same manner as if the compensating apparatus were not present, thereby avoiding the necessity for retaining liquid under pressure in the compensating apparatus. The locking together of the travelling block and hook, and their release from one another, can be effected from a remote point under the control of the operator.

In the event of sudden release or reduction of the load on the compensating apparatus, the pressure therein would tend to drive the lower portion of the apparatus upwardly and create its impacting action against other portions of the apparatus, with potential damage to the parts.

A further objective of the present invention is to provide a safety arrangement in which impact blows, or the like, cannot occur, since the upward travel of the lower portion of the compensating device, in the event of sudden reduction of the load thereon, is comparatively gradually arrested.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings.

Figure 1:
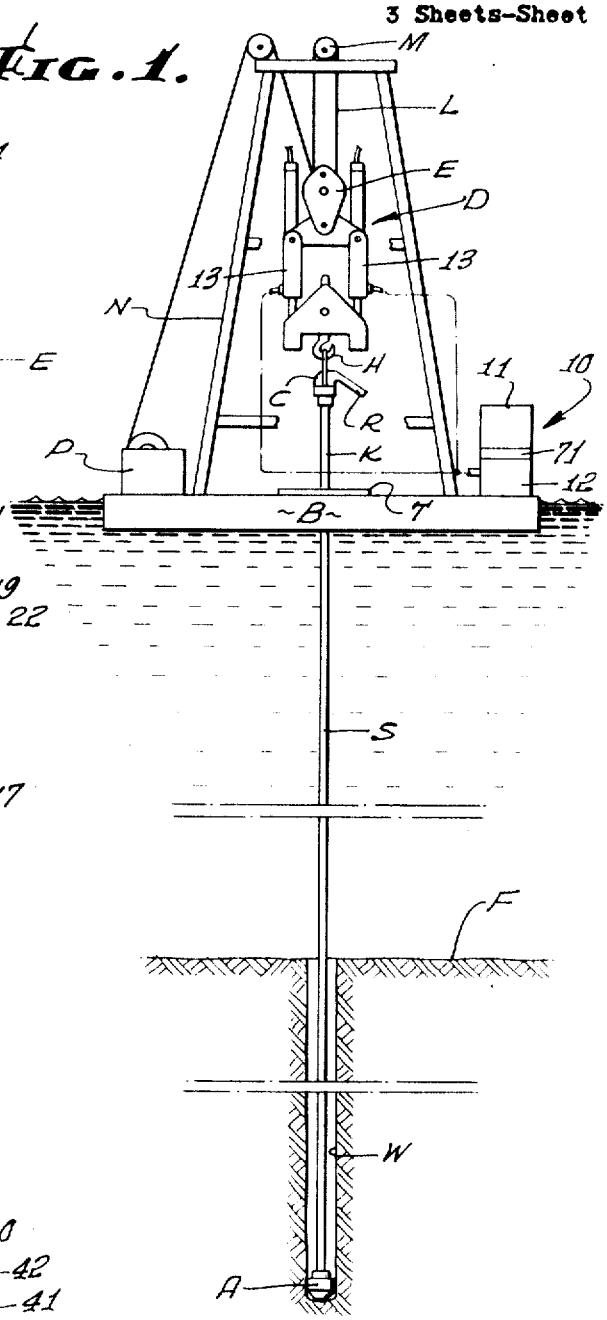
FIG. 1 is a diagrammatic view of an apparatus embodying the invention in association with a rig mounted on a floating vessel for drilling a well bore underlying a body of water.
Figure 2:
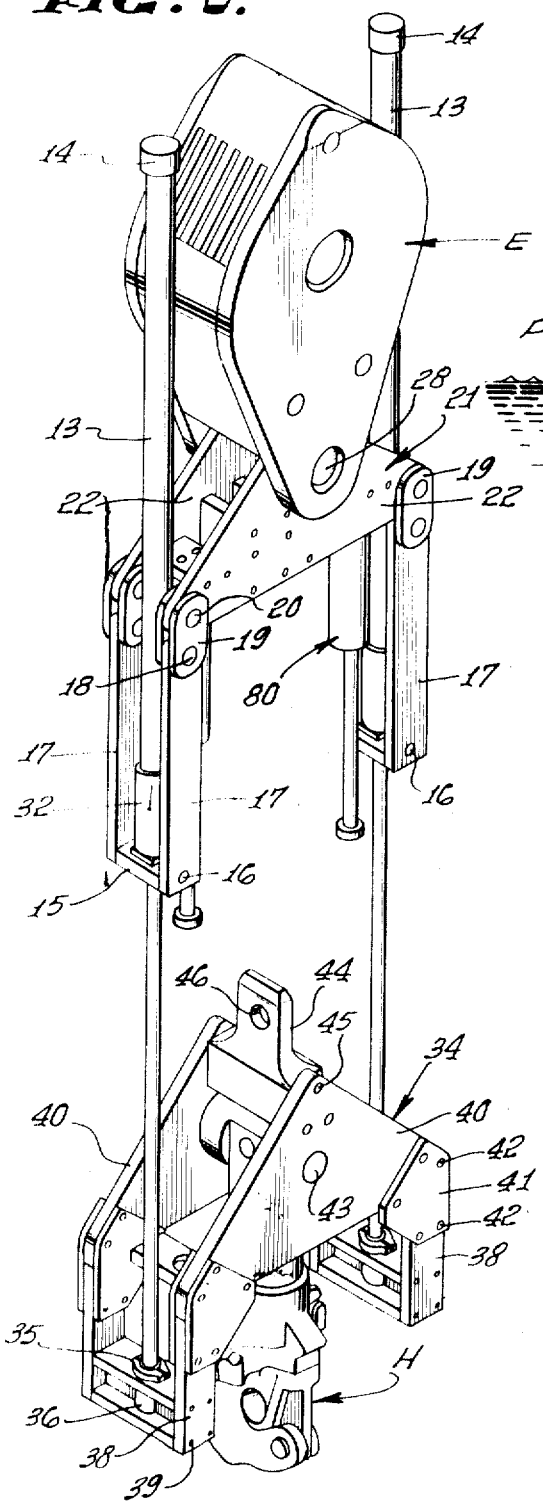
FIG. 2 is an isometric projection of a compensating apparatus in association with a travelling block and hook, the compensating apparatus being in its extended position.

An apparatus is illustrated in the drawings in connection with the drilling of a vertical well bore W from a sub-aqueous floor F above which a drilling barge B, or other floating vessel, is located, the barge being suitably anchored against lateral displacement for the purpose of holding a drilling string S in centered relation with respect to the well bore. A drill bit A is secured to the lower end of the drill string, such as a string of drill pipe or drill casing, the upper kelly portion K of the drill string passing through the usual rotary table T rotated by a suitable drive mechanism (not shown). The upper end of the kelly is secured to a swivel C, which is, in turn, suspended from a hook H pivotally connected to the lower portion of the compensating apparatus D, the upper portion of which is pivotally connected to a travelling block E associated with the usual lines L passing over a crown block M at the upper end of the derrick N mounted on the floating drilling vessel, the lines being connected to a suitable drawworks P mounted on the vessel.

A mud line R is connected to the swivel for the purpose of pumping drilling mud, or the like, down the drill string S for discharge from the bit A for the purpose of removing the cuttings produced by the latter, while the bit is rotated by the drill string an appropriate drilling weight is imposed thereon. Usually, the drilling weight is provided by a suitable length of drill collars disposed in the lower portion of the drill string immediately above the drill bit, the drill string above the drill collars being maintained in tension by the drawworks P and lines L, the drawworks permitting the drill string to lower as the hole is cut by the bit.

The compensating apparatus D permits the floating vessel B, and the mechanism carried thereby, to shift vertically relative to the well bore W without appreciably modifying the stress in the drill string S, and, therefore, the drilling weight imposed on the drill bit. Through the maintenance of fluid pressure in the compensating apparatus, the tension or strain in the drill string is maintained substantially constant at a selected value, despite the heaving of the floating vessel in the body of water. The system for maintaining the desired pressure in the supporting fluid in the compensating apparatus may be that disclosed in the above United States patents. However, it is preferred to employ the system illustrated and described in the application of Edward Larralde and Ronald E. Beaufort, for "Hydraulic-Pneumatic Weight Control and Compensating Apparatus," Ser. No. 69,758, filed Sept. 4, 1970. In general this latter system maintains the pressure of the liquid in the cylinders of the compensating apparatus at a selected constant value through use of an accumulator 10 in which the pressure of a gas 11 in an accumulator is transferred to a liquid medium 12 and to the portion of such liquid medium disposed in the cylinders 13 of the compensating apparatus.

As specifically disclosed in the drawings, a pair of upper cylinders 13 are disposed on opposite sides of the travelling block E, the upper ends 14 of the cylinders terminating in substantially the same horizontal plane as contains the upper end of the travelling block. The lower end of each cylinder is connected to a base member 15 having opposed trunnions 16 pivotally mounted in the lower ends of lower links 17 straddling the cylinder, the upper ends of the links being connected by pins 18 to upper links 19, which, in turn, are connected by pins 20 to an upper supporting structure or yoke 21 that includes spaced vertical members 22 maintained in parallel spaced relation with respect to each other by being suitably secured to intervening cross members or support plates 23 to 27. The lower ends portions of the sides of the travelling block E overlap the yoke members 22, being pivotally secured thereto by a transverse pivot pin 28 passing through the upper portions of the yoke members 22 and the lower portions of the travelling block.

A piston 29 is slidable in each cylinder, carrying suitable seal rings [20] *30* thereon for slidably sealing against the cylinder wall. The piston is connected to the upper end of a piston rod 31 extending through the rod end 32 of the cylinder which carries a suitable side seal ring 33 thereon for slidably sealing against the periphery of the rod. The lower ends of the rods depending from the cylinders straddle and are disposed on opposite sides of the hook H, being suitably secured to the lower portions of a supporting structure 34, which also straddles the hook. As specifically disclosed, a collar 35 clamped around an upper collet 35a of a cross member 36 causes the collet to grip the lower portion of each rod, a nut 37 being threaded on the rod and bearing against the lower end of the cross member. The cross members are suitably secured to vertical plates 38, as through use of threaded fastening elements 39, which are attached to opposed upper members 40 of the supporting structure 34 in any suitable manner, as through use of plates 41 and screws 42, the opposed members having a supporting pin 43 extending therethrough which also passes through the upper end of the hook H, which is permitted to pivot about the axis of the supporting pin 43.

The tongue portion 44 of a releasable lock device, described more fully hereinbelow, extends between the opposed members 40, being secured thereto in any suitable manner, as through use of threaded fastening elements 45, the tongue extending above the upper ends of the opposed members 40 and having a hole 46 therethrough for reception of a companion locking member 47 mounted on the upper supporting structure 21 (FIG. 3), the upper end of the tongue being tapered to provide a guide or a nose 48.

It will be noted that the links 17, 19 on opposite sides of each cylinder 13 are spaced transversely from one another, and that the vertical supporting portions 38, 41, 40 of the lower yoke structure 34 are also spaced from one another, so as to permit maximum relative elevation of the piston rods 31 within the cylinders 13 to the extent at which the upper ends of the opposed members 40 are disposed closely adjacent to the lower ends of the side members 22 of the upper supporting structure 21, and with the collets 35a disposed closely adjacent to the bases 15 secured to the lower ends of the cylinders. With the parts in this relative position, the tongue 44 is disposed between a pair of lock receiver plates 24, 25, which also function as cross members secured to the opposed members 22 of the upper supporting structure. One of these plates 25 has a hole 50 alignable with the hole 46 in the lock tongue, the other of the plates 24 and an outboard support plate 23 carrying a support sleeve 51 in which a cylinder lock pin 47 is slidable, this cylinder being adapted to occupy a position in the support sleeve 51 fully retracted from the holes 46, 50 in the tongue 44 and lock plate 25, or to be moved into such holes when they are aligned with one another for the purpose of locking the lower supporting structure 34 to the upper supporting structure 21 when the compensator apparatus D is to be held ineffective and in a fully collapsed position, the bases 15 being disposed adjacent to the collets 35a at this time, and with the links 17 mounted within the side members 38, 41, 40 of the lower supporting structure.

The cylindrical lock pin 47 is slidable along a piston 53 received within an internal cylinder 54 of the lock pin, this piston being secured to a piston rod 55 projecting through a cylinder head 56 threadedly secured to the lock pin 47, the other end of the rod being threadedly attached to the outer end of the support sleeve 51. A hose 57 is suitably connected to a pin retracting passage 58 in the piston rod that communicates with an annular cylindrical space 59 between the piston and the rod end 56 of the cylinder. Fluid under pressure can also be transmitted through a suitable hose 60 connected to a locking passage 61 provided in the piston rod, which opens into the cylinder space 62 forwardly of the piston, the outer end of this cylinder space being closed by a suitable plug or closure member 63. Leakage of fluid from these spaces 59, 62 is prevented by suitable seal rings 64 on the piston slidably engaging the inner wall of the cylinder lock pin 47, and by a suitable rod packing 65 on the cylinder head 56 slidably and sealingly engaging the periphery of the piston rod 55.

When fluid under pressure is introduced through the locking passage 61 into the locking cylinder space 62, with the pin retracting passage 58 being open to discharge of fluid from the retracting cavity 59, the lock pin is projected in a forward direction into both holes 46, 50 in the tongue 44 and the lock plate 25, thereby locking the lower supporting structure 34 to the upper supporting structure 21, and retaining the compensating apparatus in its fully telescoped or collapsed position. On the other hand, the relieving of the pressure in the locking passage 62 and the introduction of pressure through the retracting passage 58 into the annular cavity 59 will cause the cylindrical lock pin 47 to be retracted completely from the holes 50, 46, thereby allowing removal of the tongue 44 with respect to the receiver lock plates 24, 25, and the lowering of the hook H with respect to the travelling block E.

As described in the above patent application of Edward Larralde and Ronald E. Beaufort, liquid under pressure is present in the annular cylinder space 70 around each piston rod 31, exerting an upward lifting force on the pistons 29 and the rods 31. The desired pressure in the liquid is maintained by an accumulator arrangement 10 in which a suitable gas 11 under pressure will exert its pressure force through a floating piston 71 on the liquid 12 in the system (FIG. 1). Heaving of the vessel B can take place without inducing corresponding motion in the running string S supported from the hook H, inasmuch as the entire rig, with the crown block M, lines L, travelling block E and cylinders 13 move vertically with respect to the drill string, the appropriate tension in the drill string being maintained. Relative tilting between the compensating apparatus D and hook H can take place about the axis of the hinge pin 43. Tilting can also take place about the axis of the transverse pivot pin 28 pivotally securing the upper structure 21 to the travelling block E. In this connection, the links 17, 19 and the pin connections 16, 18, 20 therebetween and with the cylinders 13 and upper structure 21 permit the relative tilting action to occur between the compensating apparatus D and the travelling block E and hook H.

It is to be noted that the upper portions of the cylinders 13 extend on opposite sides of the travelling block E, terminating substantially in the horizontal plane of the upper end of the travelling block. Similarly, the piston rods 31 and the lower supporting structure 34 extend downwardly along a substantial length of the hook H. In addition, the ability of the links 17, 19 to nest between the sides 38, 41, 40 of the lower supporting structure, when the compensating apparatus is in a fully collapsed position, and with the pistons 29 at the upper ends of the cylinders 13, decreases considerably the overall collapsed height of the apparatus, adding only a few feet to the total distance between the lower end of the hook H and the upper end of the travelling block E, as compared with conventional apparatus in which the hook H is pivotally connected directly to the travelling block. The relationship of parts, by adding only a short length to the overall length of the apparatus, permits standard types of derricks N to be used and the usual maximum length of drill pipe, and the like, to be raised and lowered in the derrick. This is to be distinguished with the mounting of a single cylinder 13, and piston 29 and rod 31 between the travelling block and hook and in alignment therewith, as in the prior art, which would limit the total length of pipe that could be elevated in a standard derrick, or which would require the use of derricks of additional height, as compared with the heights of derricks presently being used.

The present arrangement not only shortens considerably the overall height of the apparatus D when in the collapsed position, but it also decreases the head room required above the travelling block during the operation of the compensator apparatus. If a single cylinder, piston and piston rod were used, in alignment with the travelling block and hook, the additional head room required would be more than twice the stroke of the unit. However, by virtue of the present straddling relationship between the cylinders 13 and travelling block E, and of the lower portions of the piston rods 31 with respect to the hook H, only about one-half of the additional head room is required, and this added requirement of head room is already provided for in the standard heights of derricks. In addition, through avoiding the necessity of providing derricks of extra height, the center of gravity of the derrick is maintained at a lower point, which is of importance with a derrick mounted on a floating vessel.

The apparatus D can be locked in its fully retracted or collapsed position when the drill pipe is to be "round tripped", or when it is desirable for the motion compensating apparatus to be held in inoperative condition.

Figure 3:
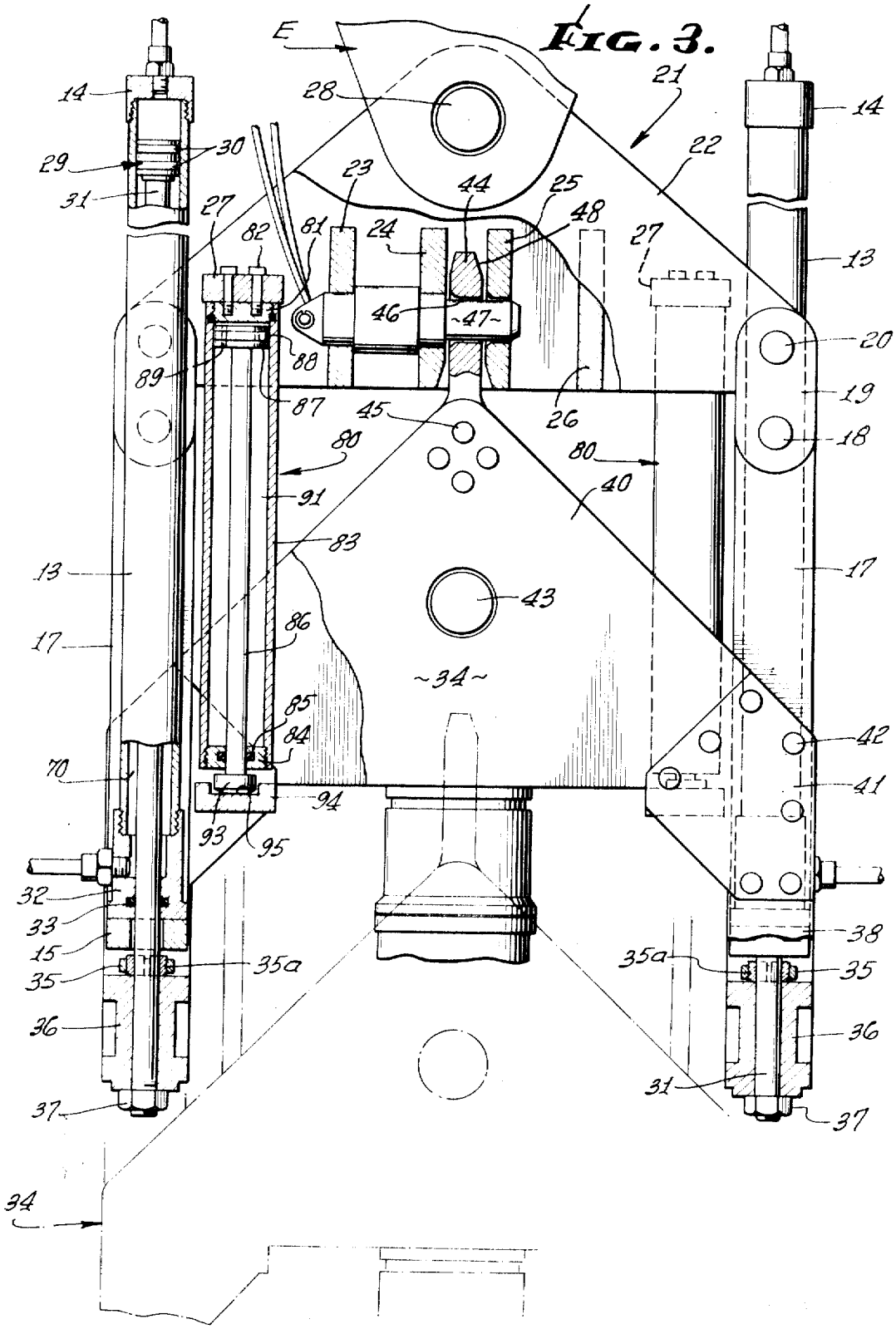
FIG. 3 is an enlarged front elevational view, with parts shown in longitudinal section, of the apparatus disclosed in FIG. 2 in a fully telescoped or collapsed position.
Figure 4:
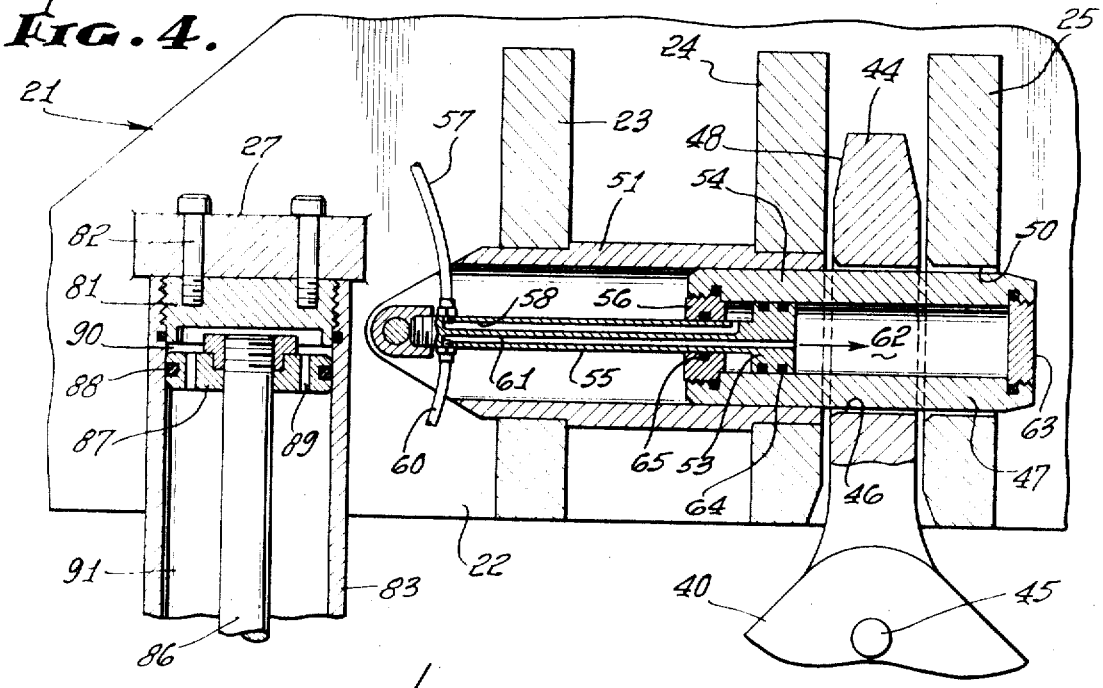
FIG. 4 is an enlarged longitudinal section through the lock and shock absorber positions of the apparatus disclosed in FIG. 2.
Figure 5:
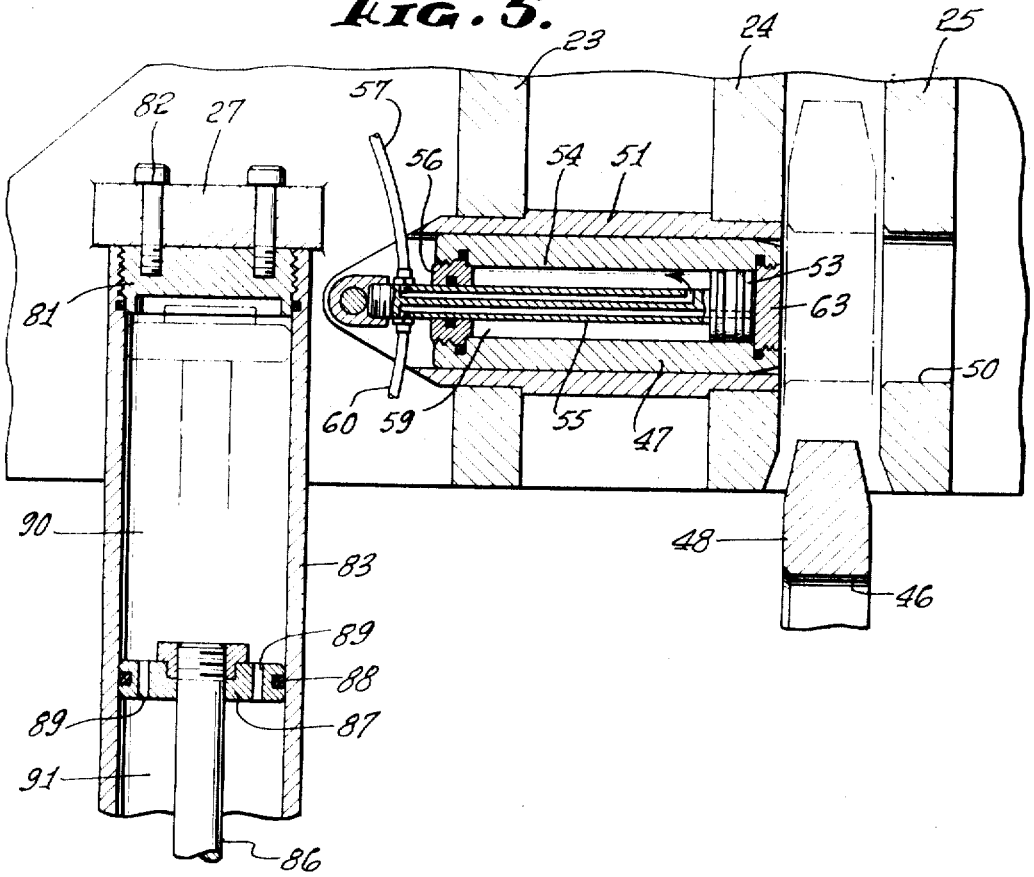
FIG. 5 is a view similar to FIG. 4 illustrating the lock and shock absorber portions in different positions as compared to the positions disclosed in FIG. 4.

Such locking can take place upon relatively lowering the travelling block E toward the hook H, so that the cylinders 13 shift downwardly along the pistons 29 and piston rods 31 to the fully collapsed position, the locking tongue 44 being disposed between the receiver plates 24, 25 with the tongue hole 46 in alignment with the cylinder lock pin 47 and the companion hole 50 in the receiver lock plate 25. Fluid under pressure is then introduced through the locking passage 61 into the cylinder space 62 forwardly of the piston 53 to shift the pin 47 through the holes 46, 50 to its fullest extent, as illustrated in FIGS. 3 and 4. The pin 47 will remain in that condition. The rig is now in condition to be used for "round tripping", or the like, in the same manner as if the compensating portion D of the apparatus were absent.

When the compensating apparatus is to be permitted to function, the fluid pressure in the locking passage 61 and cylinder cavity 62 is relieved, and fluid under pressure introduced through the retracting passage 58 into the annular cavity 59, thereby effecting shifting of the lock pin 47 to its fully retracted position, in which it has been completely withdrawn from the holes 50, 46 in the receiver lock plate 25 and tongue 44, whereupon the travelling block E and hook H can move vertically with respect to each other, the cylinders 13 shifting longitudinally with respect to the pistons 29 and piston rods 31.

In the event of a sudden reduction in the load on the travelling hook E, as through a twist off, or other failure, of the drill pipe S, the fluid 12 under pressure tends to drive the pistons 29 and rods 31 upwardly in a comparatively rapid manner, which could cause an impacting of the parts upon one another, such as an impacting of the collets 35a on the bases 15 of the cylinder supporting structures. Such sudden shifting and potential damage to the apparatus is prevented by the provision of velocity sensitive shock absorbers 80 that can operate between the upper and lower supporting structures 21, 34. Each of these shock absorbers includes an upper cylinder head 81 secured by screws 82, or the like, to a cross plate 27 suitably attached to the side members 22 of the upper structure 21, an elongate cylinder sleeve 83 being threadedly secured to this head and extending downwardly therefrom. A lower head 84 is threadedly secured to this sleeve 83, this lower head having a suitable packing 85 slidably sealing against a piston rod 86 extending therethrough and upwardly into the cylinder sleeve, the upper end of the rod being suitably attached to a piston 87 having a packing 88 thereon for slidably sealing against the wall of the cylinder sleeve 83. This piston has one or a plurality of orifices 89 extending therethrough and interconnecting the cylinder space 90 above the piston with the annular cylinder space 91 below the piston. The cylinder is completely filled with oil, or other suitable liquid, both above and below the piston 87.

Normally, gravity will pull each piston rod 86 and piston 87 downwardly, the liquid in the lower cylinder space 91 transferring in a relatively slow manner through the orifices 89 to the cylinder space 90 above the piston. Accordingly, during the normal operation of the compensator apparatus, the piston 87 is disposed in the lower portion of the cylinder 83, with the piston rod 86 depending downwardly to a substantial extent below the lower cylinder head 84, there being an impact head 93 threadedly attached to the lower end of the piston rod.

An actuating cross plate 94 is secured to the side members 40 of the lower structure 34 in alignment with each piston rod 86, this actuating plate having an upwardly opening recess 95 therein of a diameter to receive the impact head 93.

Assuming the shock absorbing pistons 87 and piston rods 86 are in their lower position within the shock absorber cylinders 83, and the compensating apparatus D in its normal operating condition in which relative vertical movement can occur between the travelling block E and hook H, as well as between the compensator cylinders 13, on the one hand, and pistons 29 and piston rods 31, on the other hand, the shock absorbers 83 play no part in the operation of the apparatus. However, in the event the load on the hook H is suddenly reduced, the compensating pistons 29 and rods 31 retract upwardly suddenly. Such upward movement is decelerated and brought to a relatively gradual stop by the engagement of the actuating plates 94 with the impact heads 93, resulting in the piston rods 86 and the pistons 87 connected thereto being urged upwardly in the shock absorber cylinders 83. However, the rate of upward movement of the lower supporting structure 34 and of the rods 86 and pistons 87 is retarded by the necessity of the liquid in the shock absorber cylinders above the pistons 87 to transfer through the flow restricting orifices 89 into the cylinder spaces 91 below the pistons 87, time being required for each liquid transfer to take place, thereby gradually bringing the lower supporting structure 34 and the pistons 29 and piston rods 31 connected thereto to a full stop, which will occur when the compensating apparatus D is disposed in its fully collapsed position. Thus, the velocity sensitive shock absorbers 80 function to decelerate movement of the lower portion of the apparatus with respect to the upper portion, preventing the parts from impacting with high energy upon one another.

When the compensating apparatus is again to be placed in an operative condition, relative lowering of the lower structure 34, piston rods 31 and pistons 29 relative to the compensator cylinders 13 and upper structure 21 can take place without restraint, the lowering of the actuating plates 94 with respect to the shock absorber impacting heads 93 and rods 86 allowing the shock absorber rods 86 and pistons 87 to gradually descend in the shock absorber cylinders 83 to their lowermost position, in which they can again be effective to decelerate the upward movement of the lower portions of the compensator relative to the upper portions.

We claim:

1. In apparatus for maintaining a predetermined stress in a running string supported by a rig mounted on a vessel floating in a body of water: a motion compensator apparatus for maintaining the running string in substantially a predetermined position as the vessel heaves in the body of water, comprising an upper support carried by said rig, a lower support connectible to the running string, a plurality of cylinder means, a plurality of piston means slidable in said plurality of cylinder means, one of said plurality of means being connectible to one of said supports, the other of said plurality of means straddling and being connected to the other of said supports, and means for maintaining a fluid medium under pressure in said plurality of cylinder means on one side of said plurality of piston means as said plurality of piston means and plurality of cylinder means move longitudinally relative to one another in both longitudinal directions in response to heaving of said vessel in the body of water.

2. In apparatus as defined in claim 1; said one of said plurality of means straddling said one of said supports.

3. In apparatus as defined in claim 1; said one of said plurality of means being connected to said lower support; said other of said plurality of means being connected to said upper support.

4. In apparatus as defined in claim 1; said one of said plurality of means being connected to said lower support; said other of said plurality of means being connected to said upper support; said one of said plurality of means straddling said lower support.

5. [In] *An* apparatus *which, when mounted in a rig mounted in a derrick, said rig including a running string, a travelling block and a hook, is suitable, when connected to a source of fluid pressure* for maintaining a predetermined stress in a running string; *said apparatus including* a first support *having opposite sides; means on said first support, intermediate its opposite sides for connecting a travelling block to said first support;* a second support *having opposite sides, means on said second support for connecting a hook to said second support* [connectible to the running string]; a plurality of cylinder means; a plurality of piston means slidable in said plurality of cylinder means; one of said plurality of means being connected to *the opposite sides of* one of said supports; the other of said plurality of means [straddling and] being connected to *the opposite sides of* the other of said supports; *one of said piston means being connected to said other support at one side of said other support and another piston means connected to said other support at the other side of said other support;* and means *on each cylinder* for *connection to a source of fluid under pressure for* maintaining a fluid medium under pressure in said plurality of cylinder means on one side of said plurality of piston means as said plurality of piston means and plurality of cylinder means move longitudinally relative to one another in both longitudinal directions; and means *mounted on each support* for releasably locking said supports to each other to prevent relative longitudinal movement between said plurality of cylinder means and a plurality of piston means.

6. [In] *An* apparatus *which, when mounted in a rig mounted in a derrick, said rig including a running string, a travelling block and a hook, is suitable, when connected to a source of fluid pressure* for maintaining a predetermined stress in a running string: *said apparatus including* a first support *having opposite sides, means on said first support for pivotally connecting a travelling block to said first support;* a second support *having opposite sides, means on said second support for pivotally connecting a hook to said second support* [connectible to the running string]; a plurality of *cylinders* [cylinder means]; a plurality of *pistons and piston rods* [piston means] slidable in said plurality of cylinders [cylinder means]; [one of said plurality of means being connected to one of said supports; the other of said plurality of means straddling and being connected to the other of said supports]; and means *on each cylinder* for *connection to a source of fluid under pressure for* maintaining a fluid medium under pressure in said plurality of cylinder means on one side of said plurality of *pistons* [piston means] as said plurality of *pistons* [piston means] and plurality of *cylinders* [cylinder means] move longitudinally relative to one another in both longitudinal directions; said [one of said] plurality of *piston rods* [means being] connected to said second support; *one on each side of said second support* [said other of said plurality of means] *said cylinders* [being] connected to said first support *one on each side of said first support;* and means *mounted* on each *support* for releasably locking said supports to each other when said plurality of *pistons* [piston means] are fully telescoped within said plurality of *cylinders* [cylinder means] to prevent relative longitudinal movement between said plurality of *cylinders* [cylinder means] and plurality of *pistons* [piston means].

7. In apparatus as defined in claim [6] *5*; means for decelerating relative longitudinal movement between said plurality of cylinder means and plurality of piston means upon substantial reduction in the stress in the running string; said decelerating means being disposed substantially parallel to and between at least one of said plurality of means.

8. [In] *An* apparatus *which, when mounted in a rig mounted in a derrick said rig including a running string, a travelling block and a hook and when connected to a source of fluid pressure, is suitable* for maintaining a predetermined stress in [a] *said* running string: *said apparatus including* a first support *having opposite sides; means on said first support for connecting a travelling block to said first support;* a second support *having opposite sides; means on said second support for connecting a hook to said second support* [connectible to the running string]; a [plurality] *pair* of cylinder means; a *pair* [plurality] of piston means slidable in said [plurality] *pair* of cylinder means; one of said *pair of* [plurality of means being] *said cylinder means being* connected to *the opposite sides of* one of said supports; *one cylinder means connected to each side of said one support; said pair of piston means being connected to the opposite ends of the other of said support, one piston means connected to each side of said other support* [the other of said plurality of means straddling and being connected to the other of said supports]; and means *mounted on each cylinder for connection to a source of fluid pressure* for maintaining a fluid medium under pressure in said [plurality] *pair* of cylinder means on one side of said [plurality] *pair* of piston means as said [plurality] *pair* of piston means and [plurality] *pair* of cylinder means move longitudinally relative to one another in both longitudinal directions; and means for decelerating relative longitudinal movement between said [plurality] *pair* of cylinder means and [plurality] *pair* of piston means upon substantial reduction in the stress in the running string.

9. In apparatus as defined in claim 8; said decelerating means being disposed substantially parallel to and between at least one of said [plurality] *pair* of means.

10. In apparatus for maintaining a predetermined stress in a running string disposed in a well bore and which is supported by a rig, including a derrick and a suspension mechanism supported from the upper portion of the derrick: a travelling block adapted to form part of the suspension mechanism; a hook adapted to support the running string therebelow; a motion compensating apparatus between and connected to said block and hook, said motion compensating apparatus comprising an upper support connected to said travelling block, a lower support connected to said hook; a plurality of cylinder means carried by one of said supports and straddling said travelling block or hook; a plurality of piston means slidable in said cylinder means and carried by said other of said supports; and means for maintaining a fluid medium under pressure in said plurality of cylinder means on one side of said plurality of piston means as said plurality of piston means and plurality of cylinder means move longitudinally relative to one another in both longitudinal directions.

11. In apparatus as defined in claim 10; said plurality of cylinder means being carried by said upper support, extending upwardly therefrom, and straddling said travelling block, said plurality of piston means being carried by said lower support.

12. In apparatus as defined in claim 10; said plurality of cylinder means being carried by said upper support, extending upwardly therefrom, and straddling said travelling block, said plurality of piston means being carried by said lower support and straddling said lower support, the lower portion of said plurality of cylinder means moving into a position straddling said lower support when said plurality of piston means are telescoped substanially fully within said plurality of cylinder means.

13. In apparatus as defined in claim 10; said plurality of cylinder means being carried by said upper support, extending upwardly therefrom, and straddling said travelling block, said plurality of piston means being carried by said lower support and straddling said lower support and hook, the lower portion of said plurality of cylinder means moving into a position straddling said lower support and hook when said plurality of piston means are telescoped substantially fully within said plurality of cylinder means.

14. In apparatus as defined in claim 10; and means for releasably locking said supports to each other to prevent relative longitudinal movement between said plurality of cylinders means and plurality of piston means.

15. In apparatus as defined in claim 10; said plurality of cylinder means being carried by said upper support, extending upwardly therefrom, and straddling said travelling block, said plurality of piston means being carried by said lower support; and means for releasably locking said supports to each other when said plurality of piston means are substantially fully telescoped within said plurality of cylinder means to prevent relative longitudinal movement between said plurality of cylinder means and plurality of piston means.

16. In apparatus as defined in claim 10; said plurality of cylinder means being carried by said upper support, extending upwardly therefrom, and straddling said travelling block, said plurality of piston means being carried by said lower support and straddling said lower support, the lower portion of said plurality of cylinder means moving into a position straddling said lower support when said plurality of piston means are telescoped substantially fully within said plurality of cylinder means; and means for releasably locking said supports to each other when said plurality of piston means are substantially fully telescoped within said plurality of cylinder means to prevent relative longitudinal movement between said plurality of cylinder means and plurality of piston means.

17. In apparatus as defined in claim 10; said plurality of cylinder means being carried by said upper support, extending upwardly therefrom, and straddling said travelling block, said plurality of piston means being carried by said lower support and straddling said lower support and hook, the lower portion of said plurality of cylinder means moving into a position straddling said lower support and hook when said plurality of piston means are telescoped substantially fully within said plurality of cylinder means; and means for releasably locking said supports to each other when said plurality of piston means are substantially fully telescoped within said plurality of cylinder means to prevent relative longitudinal movement between said plurality of cylinder means and plurality of piston means.

18. In apparatus as defined in claim 10; and means for decelerating relative longitudinal movement between said plurality of cylinder means and plurality of piston means upon substantial reduction in the stress in the running string.

19. In apparatus as defined in claim 10; said plurality of cylinder means being carried by said upper support, extending upwardly therefrom, and straddling said travelling block, said plurality of piston means being carried by said lower support; and means for decelerating relative longitudinal movement between said plurality of cylinder means and plurality of piston means upon substantial reduction in the stress in the running string; said decelerating means being carried by said upper support depending therefrom, and being disposed parallel to and between said plurality of cylinder means.

20. In apparatus as defined in claim 10; said plurality of cylinder means being carried by said upper support, extending upwardly therefrom, and straddling said travelling block, said plurality of piston means being carried by said lower support and straddling said lower support and hook, the lower portion of said plurality of cylinder means moving into a position straddling said lower support and hook when said plurality of piston means are telescoped substantially fully within said plurality of cylinder means; and means for decelerating relative longitudinal movement between said plurality of cylinder means and plurality of piston means upon substantial reduction in the stress in the running string; said decelerating means being carried by said upper support, depending therefrom, and being disposed parallel to and between said plurality of cylinder means.

21. In apparatus for maintaining a predetermined stress in a running string disposed in a well bore and which is supported by a rig, including a derrick and a suspension mechanism supported from the upper portion of the derrick; a travelling block structure adapted to form part of the suspension mechanism; a hook structure adapted to support the running string therebelow; a motion compensating apparatus comprising cylinder means connected to and in overlapping relation to one of said structures, piston means connected to the other of said structures and slidable relatively in said cylinder means; and means for maintaining a fluid medium under pressure in said cylinder means on one side of said piston means as said piston means and cylinder means move longitudinally relative to one another in both longitudinal directions, whereby the predetermined stress in the running string is maintained.

22. In apparatus as defined in claim 21; said cylinder means being connected to and in overlapping relation to said travelling block structure; said piston means being connected to said hook structure.

23. In apparatus as defined in claim 21; and means for releasably locking said cylinder means and piston means to each other when said piston means is substantially fully telescoped within said cylinder means to prevent relative longitudinal movement between said cylinder means and piston means.

24. In apparatus as defined in claim 21; said cylinder means being connected to and in overlapping relation to said travelling block structure; said piston means being connected to said hook structure; and means for releasably locking said cylinder means and piston means to each other when said piston means is substantially fully telescoped within said cylinder means to prevent relative longitudinal movement between said cylinder means and piston means.

*25. Apparatus as defined in claim 1; a hook connectible to the running string and pivotally connected at an intermediate point to said lower support; and means for pivotally connecting said upper support to said rig.*

*26. An apparatus as defined in claim 10; means pivotally connecting said upper support to said travelling block at an intermediate point of said upper support; and means pivotally connecting said lower support to said hook at an intermediate point of said lower support.*

*27. An apparatus useful for maintaining a predetermined stress in a running string positioned in a well bore, and supported by a rig including a travelling block and a hook from which said running string is suspended, said apparatus including a support having opposite sides means on said support adapted for pivotal connection to a travelling block, another support having opposite sides means on said another support adapted for pivotal connection to a hook, a pair of cylinders carried by one of said supports, one cylinder at each side of said one support, pistons and piston rods slidable in each of said cylinders, one of said piston rods connected to each side of said another support, means on each cylinder for connection to a source of fluid pressure.*

*28. The apparatus of claim 27, said connection between said piston rods and said another support providing an articulated connection between said supports.*

*29. An apparatus as defined in claim 27; and means mounted on said supports for releasably locking said supports to each other to prevent relative longitudinal movement between said cylinders and said pistons.*

*30. An apparatus as defined in claim 27; and means for decelerating relative longitudinal movement between said cylinders and said pistons.*

*31. An apparatus which, when mounted between the travelling block and the hook of a rig supported in a derrick, which apparatus when connected to a source of fluid pressure is suitable for maintaining a predetermined stress in a running string connected to said hook, said apparatus including a travelling block structure having opposite sides and adapted for connection to a travelling block; a hook structure having opposite sides and adapted for connection to a hook; a cylinder connected to each side of said travelling block structure, pistons in said cylinders, said pistons being connected at each side of said hook structure; and means on said cylinders for connection to a source of fluid pressure.*

*32. An apparatus as defined in claim 31; said cylinders connected to and in overlapping relation to said travelling block structure.*

*33. An apparatus as defined in claim 31; and means on said apparatus for releasably locking said supports.*

*34. An apparatus as defined in claim 31 and means for decelerating relative movement between said cylinders and said pistons.*

*35. An apparatus useful for incorporation into a motion compensated rig supported by a derrick mounted on a floating vessel subject to heave which rig includes a travelling block and a hook, said apparatus comprising a pair of cylinders, a cylinder support having opposite sides and extending between said cylinders, one cylinder connected to one side of said cylinder support and the other cylinder of said pair connected to the other side of said cylinder support and means at an intermediate point of said cylinder support adapted for connection to a travelling block, pistons positioned in said cylinders, piston rods connected to said pistons, means on each cylinder for connection to a source of fluid pressure, a hook support, means at an intermediate point on said hook support adapted for connection to a hook, a force transmitting connection between each piston rod and said hook support at each side of said hook support.*

*36. The apparatus of claim 35 and a lock means mounted on said supports to releasably connect said supports.*

*37. In the apparatus of claim 35 and means to decelerate the relative movement of said pistons and said cylinders.*

*38. An apparatus for maintaining a predetermined stress in a running string supported by a rig mounted on a vessel floating in a body of water: a motion compensator apparatus for maintaining a substantially constant stress in the running string as the vessel heaves in the body of water, comprising an upper support having opposite sides*

*and adapted to be connected to said rig, a lower support having opposite ends and adapted to be connected to said running string, a pair of cylinders, pistons and piston rods slidable in said cylinders, one of said cylinders connected to said upper supports at each side of said upper support, said piston rods connected to said lower support at each side of said lower support, and means for maintaining a fluid medium under pressure in said plurality of cylinder means on one side of said pistons as said plurality of pistons and plurality of cylinders move longitudinally relative to one another in both longitudinal direction in* response *to heaving of said vessel in the body of water.*

*39. An apparatus which, when mounted between the travelling block and the running string supported in a derrick and which when connected to a source of fluid pressure, is suitable for maintaining a predetermined stress in said running string, said apparatus including a travelling block structure having opposite sides, and means for pivotal connection to a travelling block, a cylinder connected to each side of said travelling block structure, pistons and piston rods in each of said cylinders, means on each of said piston rods for connection to said running string and means on said cylinders for connection to a source of fluid pressure.*

*40. In the apparatus of claim 39, a second structure having opposite sides, an articulated connection between each of said piston rods and each side of said second structure, said articulated connection providing articulated connection between said first-mentioned and second-mentioned structures.*

*41. An apparatus as defined in claim 39; said pivotal connection being located centrally between said cylinders.*

*42. In the apparatus of claim 39, a second structure having opposite sides, an articulated connection between each of said piston rods and each side of said second structure, said articulated connection providing articulated connection between said first-mentioned and second-mentioned structures, said pivotal connection being located centrally between said cylinders.*

References Cited

The following references, cited by the Examiner, are of record in the patented file of this patent or the original patent.

UNITED STATES PATENTS

| | | | |
|---|---|---|---|
| 3,460,638 | 8/1969 | Millsapps | 175—85 |
| 3,390,654 | 7/1968 | Bromell | 175—5 X |
| 3,369,793 | 2/1968 | Boldrick | 254—30 |
| 3,469,820 | 9/1969 | Horton | 254—172 |
| 2,613,102 | 10/1952 | Roberson | 214—2.5 X |
| 2,857,138 | 10/1958 | Svendsen et al. | 175—27 |
| 3,012,610 | 12/1961 | Bauer et al. | 175—7 X |
| 3,151,686 | 10/1964 | Kammerer | 175—5 |
| 3,158,208 | 11/1964 | Kammerer | 175—5 X |
| 3,208,728 | 9/1965 | Parks | 175—27 X |
| 3,266,582 | 8/1966 | Homanick | 175—85 X |
| 3,369,793 | 2/1968 | Boldrick | 254—130 |
| 3,460,638 | 8/1969 | Millsapps | 175—85 |
| 3,511,476 | 5/1970 | Horton | 254—172 X |
| 3,550,697 | 12/1970 | Hobhouse et al. | 175—26 |
| 3,605,919 | 9/1971 | Bromell et al. | 175—27 |

FRANK L. ABBOTT, Primary Examiner

R. E. FAVREAU, Assistant Examiner

U.S. Cl. X.R.

175—27; 254—172